2,967,891
MANUFACTURE OF SECONDARY BUTYLBENZENE HYDROPEROXIDE

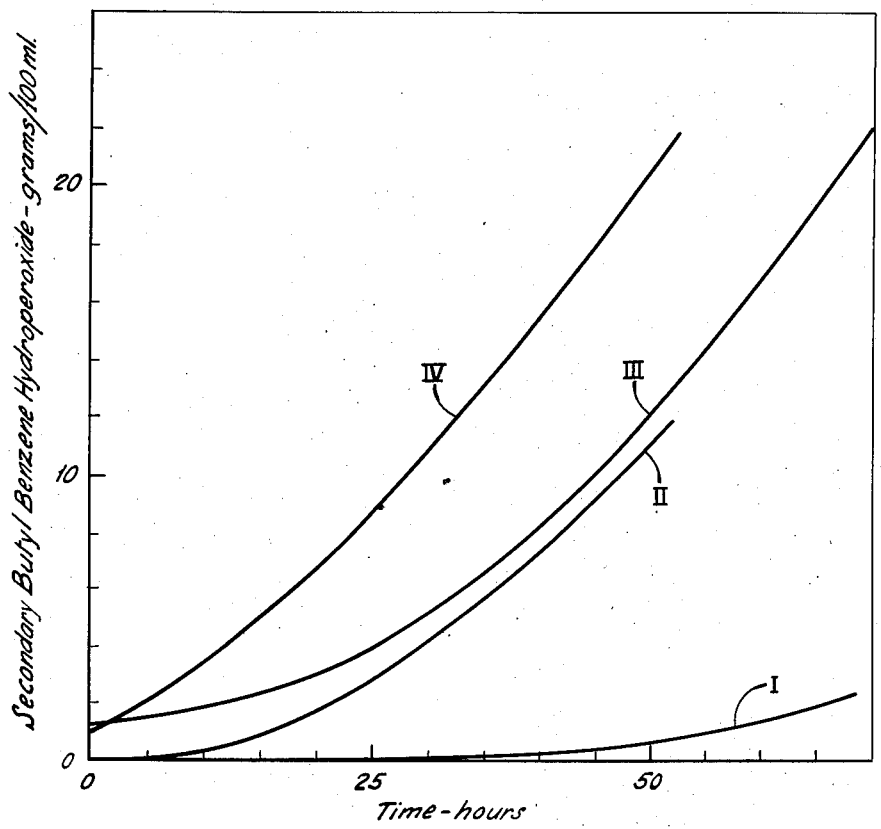

Charles B. Holder, Beacon, N.Y., assignor to Texaco Inc., a corporation of Delaware Filed Apr. 3, 1958, Ser. No. 726,145

4 Claims. (Cl. 260—610)

This invention relates to improvement in process for the manufacture of secondary butylbenzene hydroperoxide, and more particularly to the improvement in manufacturing it by oxidizing liquid phase secondary butylbenzene with elemental oxygen.

Hydroperoxidation of alkyl benzenes has been developed quite highly in recent years because, upon acid cleavage of the alkyl benzene hydroperoxide, phenol and a ketone are formed. Thus, acid cleavage of cumene hydroperoxide yields phenol and acetone, and acid cleavage of secondary butylbenzene hydroperoxide yields phenol and methylethyl ketone.

In general, I have found that secondary butylbenzene is much more refractory towards hydroperoxidation than is cumene under comparable experimental conditions, and, furthermore, various additives and their combinations which are known to enhance cumene hydroperoxidation do not give perceptible enhancement to a similar secondary butylbenzene hydroperoxidation. Additionally, I have found that, in the hydroperoxidation of various samples of high quality secondary butylbenzene, the reaction is pronouncedly erratic and comparatively slow using various conventional procedures.

Advantages of my process over previous processes for peroxidizing secondary butylbenzene include the obtention of a significantly increased rate of formation of secondary butylbenzene hydroperoxide and the suppression of irregularities ordinarily present in such reaction.

Broadly, my improvement in process involves a combination of treatments. In the first phase of my process I submit the secondary butylbenzene to oxidative pretreatment with molecular oxygen. The so-pretreated secondary butylbenzene is contacted with a strong base such as an alkali metal hydroxide, or an alkaline earth metal oxide or hydroxide, e.g. potassium, sodium or calcium hydroxides or strongly basic amine form of an ion exchange resin. The so-contacted secondary butylbenzene is separated from the strong base, and the secondary butylbenzene hydroperoxide concentration in the pretreated butylbenzene is raised to about 0.8–5 grams per 100 ml. by adding preformed secondary butylbenzene hydroperoxide to it. Then the resulting reaction mixture is oxidized with elemental oxygen at a temperature of 180–260° F. until the secondary butylbenzene hydroperoxide concentration therein is not substantially in excess of about 30 grams per 100 ml.

The drawing shows plots of the progress of several experimental runs, one using no special treatment, two using only individual steps of my process, and one using the inventive process combination, i.e. oxidative pretreatment and the dosing of the so-pretreated secondary butylbenzene with preformed secondary butylbenzene hydroperoxide before peroxidation. The synergism of my combination is shown definitively by the drawings and supporting data, more completely described hereinafter.

The oxidative pretreatment of my process is very simple. Elemental oxygen gas, e.g. air, oxygen-enriched air, or substantially pure oxygen, is blown through the liquid phase secondary butylbenzene starting material at a temperature of about 200–260° F. While I prefer to operate this step of my process and all the others at about atmospheric pressure for efficiency and economy, higher and lower pressures are possible, provided that the hydrocarbon charge is maintained in liquid phase. Elevation of pressure can be used to limit vapor losses, particularly when only comparatively high temperature cooling water is available. Advantageously from about 10 to 100 volumes of oxygen-containing gas per volume of charge hydrocarbon per hour is used in the oxidative pretreatment step.

The pretreating contact can be as short as about 10 minutes or prolonged to as long as about 4 hours, if desired, a duration 1 to 3 hours being quite satisfactory for general purposes. A temperature below about 180° F. does not seem to be effective for pretreating in the reasonably short time desired, and a temperature above about 260° F. increases the risk of forming undesirable by-products and giving various kinds of oxidative deterioration in the reaction mixture. Similarly, to conduct the pretreating step to such an extent that the secondary butylbenzene hydroperoxide concentration rises substantially above 0.5 gram per 100 ml. not only increases the risk of undesirable side reactions, but also prolongs the pretreating unnecessarily and, in effect, tends to nullify the advantage of obtaining the high hydroperoxidation rate available by use of my improved process. Preferably I conduct the pretreating for only 1 to 3 hours. From such pretreating the resulting formation of secondary butylbenzene hydroperoxide will be quite low, e.g. not substantially in excess of about 0.1–0.3 gram per 100 ml. Formation of the hydroperoxide under pretreating conditions is generally very slow, and the hydroperoxide so formed is insignificant.

The preferred type of contacting of the oxidatively pretreated secondary butylbenzene with a strong base is a caustic washing with a dilute aqueous solution of sodium hydroxide, e.g. 0.1 normal. Broadly, however, the base does not have to be in a dilute solution; concentrated aqueous base solutions are also permissible, and even contact with solid base, e.g. caustic soda pellets, is satisfactory. Use of a solid caustic or a concentrated solution of an alkaline material, however, can react with what little, if any, secondary butylbenzene hydroperoxide has been formed in the pretreating; when using a solid base or strong solution of base addition of preformed secondary butylbenzene hydroperoxide to the pretreated hydrocarbon should be done after the caustic contacting step so as not to impair such added material.

The separation of the caustic treated material is done in conventional manner, that is by simple parting of two immiscible liquid phases if an aqueous base is contacted with the pretreated secondary butylbenzene, or by simple decanting or filtering the liquid hydrocarbon phase away from solid caustic, if that is used. To establish the secondary butylbenzene hydroperoxide concentration in the separated, treated hydrocarbon charge it is most simple to add a secondary butylbenzene hydroperoxide concentrate from a previous secondary butylbenzene hydroperoxidation operation. In such instance, in addition to the hydroperoxide, an amount of unreacted secondary butylbenzene is added to the pretreated material. This appears to be entirely satisfactory for my operation. Establishment of a hydroperoxide concentration substantially below about 0.8 gram per 100 ml. in the pretreated reaction mixture for hydroperoxidation appears to exert too little initiator effect on the hydroperoxidation or suppressor effect on the irregularities normally present in the practical hydroperoxidation of the secondary butylbenzene. On the other hand, a concentration of added secondary butylbenzene hydroperoxide substantially in excess of 5 grams per 100 ml. gives no significant enhancement in the reaction rate in proportion to the amount of additional secondary butylbenzene hydroperoxide necessary to be recycled from a previous operation and so reprocessed at the expense of time, equipment space, and manpower. A desirable concentration of added secondary butylbenzene hydroperoxide is between about 1 and about 4 grams per 100 ml.

A suitable secondary butylbenzene for my process can be made by alkylating benzene with butylene-2 in the presence of an alkylation catalyst such as concentrated sulfuric acid. The resulting crude organic layer can be washed with sulfuric acid or aqueous caustic soda and then with water, but the acid or caustic washing can be dispensed with, if desired. The secondary butylbenzene is then purified by fractional distillation in conventional manner.

Unreacted secondary butylbenzene from my process can be recovered by simple vacuum distillation of filtered secondary butylbenzene hydroperoxide reaction product. I have found it practically equally suitable for forming secondary butylbenzene hydroperoxide as is the fresh hydrocarbon, i.e. it hydroperoxidizes substantially as readily as does fresh charge hydrocarbon when both are given my oxidative pretreatment, caustic washing, and dosing with the preformed secondary butylbenzene hydroperoxide additive before the hydroperoxidation step is attempted. The infra-red spectrum of such recovered secondary butylbenzene shows an appreciable concentration of a ketone which is probably acetophenone. Also unique in my experience is that fresh secondary butylbenzene made by alkylation of benzene with butylene-2 in the presence of sulfuric acid but not washed with sulfuric acid to remove di-secondary butyl sulfate present, is substantially as suitable in my process as is the acid-washed material.

It is to be understood that reference to the terms "hydroperoxidation" and "peroxidation" in this specification mean the same thing, that the step referred to as the "hydroperoxidation" step of my process is the one following oxidative pretreatment and strong base contacting, and that "hydroperoxide" means secondary butylbenzene hydroperoxide unless otherwise indicated.

I can use emulsion hydroperoxidation wherein water and pretreated hydrocarbon and, optionally, an emulsifier such as sodium stearate are present, and the gas containing elemental oxygen is passed through the mixture of two liquid phases. However, I prefer to use bulk hydroperoxidation wherein the pretreated hydrocarbon and hydroperoxide additive to reaction mixture is a single liquid phase. In either instance the rates are about the same, but the bulk technique makes greater reactor space available per unit time than does the emulsion technique. Mechanical agitation can be used in emulsion operation, and I have found it beneficial to a slight extent in some bulk operations, but I find that the agitation simply from oxygen-containing gas passing through the reaction mixture is usually quite satisfactory for my purpose.

In spite of the refractory quality of secondary butylbenzene towards peroxidation the reaction rates obtainable in my process are good at temperatures of about 180° F. and higher, but at temperatures substantially above about 260° F. undesirable side reactions and degradation of the product are apt to occur. Preferably, the temperature used is between about 200° and 250° F.

The rate of oxygen-containing gas feed, of course, will depend to some extent upon the available elemental oxygen in such feed; I have been able to use air and substantially pure oxygen in my process with virtually no substantial differences in hydroperoxidation rate. Broadly, the rate of oxygen-containing gas feed can be between about 0.1 and 10 volumes of gas per minute per volume of hydrocarbon (the gas volume being computed at standard conditions of 760 mm. Hg total pressure and 60° F.) and it is preferably between about 1 and 2 volumes per minute per volume of hydrocarbon (secondary butylbenzene). Throughout this application concentration of secondary butylbenzene hydroperoxide in mixtures is given in grams per 100 ml. of the mixture. As small and varying amounts of hydrocarbon or other component of the reaction mixture can be lost through volatility etc., the liquid volumes referred to in gas rates connected with pretreating are the initial charge volumes, and in gas rates connected with peroxidation are the initial liquid volumes in that step. Rates of formation of secondary butylbenzene hydroperoxide are cumulative average rates based on the expression (grams per 100 ml. of secondary butylbenzene hydroperoxide present at a particular time less initially added hydroperoxide initiator) divided by elapsed peroxidation time in hours.

The synergism of my combination of pretreatment and dosing with secondary butylbenzene hydroperoxide is particularly noticeable in peroxidation reaction times up to about 50 hours, corresponding to formation of 20-30 grams of secondary butylbenzene hydroperoxide per 100 ml. of resulting reaction product. I have found that attempting to obtain concentrations of secondary butylbenzene hydroperoxide in the peroxidation reaction mixture substantially above about 30 grams per 100 ml. often gives degradation of the reaction mixture; I have also found it advantageous to operate the hydroperoxidation step to a limit of between about 10 and 20 grams of secondary butylbenzene hydroperoxide per 100 ml. of reaction mixture, and I prefer to terminate the hydroperoxidation step at even lower concentrations for greatest efficiency and economy, e.g. 10 to 15 grams of hydroperoxide per 100 ml. These hydroperoxide concentration limits reflect added preformed hydroperoxide initiator as well as freshly-made product.

It is sometimes advantageous in the peroxidation step of my process to use basically reacting materials such as sodium carbonate, sodium bicarbonate or calcium carbonate in conjunction with the preformed secondary butylbenzene hydroperoxide initiator to neutralize possibly deleterious acidic substances which may be present in the reaction mixture initially, or which may be formed subsequently. Amounts as small as 0.1 gram per 100 ml. of reaction mixture and even as high as about 5 grams per 100 ml. of such basically reacting materials can be used, and even larger proportions can be tolerated, but these usually have no particular advantage. Additionally, I can employ an additive such as the normal salt of a strong metallic base and strong mineral acid, e.g. the chlorides, bromides, sulfates and nitrates of the alkali metals and the alkaline earth metals including magnesium, preferably in the range of 1 to 2 grams per 100 ml. of the reaction mixture, but even in a higher concentration if desired. Alternatively, or in addition to such basically reacting and normal salt additives, I can use heavy metal additives such as lead dioxide, e.g. preferably at 0.01–0.1 grams/100 ml. but permissively at even higher concentrations and/or certain organic acids notably benzoic acid, e.g. preferably at 0.01–0.1 gram/100 ml. but also permissively at even higher concentrations. My experience, as shown in the examples hereinafter, has been that some of the best hydroperoxidation rates are obtainable when the combination of lead dioxide and benzoic acid (each in the concentration range of 0.01–0.1 gram per 100 ml.) is employed conjointly with preformed secondary butylbenzene hydroperoxide in the practice of the peroxidation step of my invention. However, it must be borne in mind that the presence of heavy metal appreciably increases the risk of catalytic hydroperoxide decomposition, and that a good peroxidation rate can be secured without them in the practice of my process as broadly set forth herein.

Suitable materials of construction for operation of my process are glass, glass-lined steel, Type 3S aluminum, and austenitic stainless steels such as Types 304 and 316. Copper reactors preferably are avoided because the presence of copper salts, usually present on the surface of such reactors, can be highly deleterious; they can catalyze the decomposition of hydroperoxide.

The following examples are illustrative of my invention, but they are not intended to limit the invention. Concentration of secondary butylbenzene hydroperoxide was determined in all cases iodometrically and corrected for systematic error. The secondary butylbenzene in all cases was made by alkylating benzene with butylene-2 in the presence of concentrated sulfuric acid, separating the resulting organic layer, washing it with concentrated sulfuric acid and with water, then fractionally distilling to take a cut boiling at 221–223° F. under 100 mm. Hg total pressure. The refractive indices $N_D^{20}$ and $N_D^{25}$ were 1.4898 and 1.4873, respectively. After oxidative pretreatment with air or substantially pure oxygen the hydrocarbon was washed with 40% of its volume of 1 N aqueous caustic soda solution, then twice with water, filtered, and used without further treatment. All exemplary operations were made by the bulk technique with the oxygen or air supplied to the hydrocarbon through a fritted glass fitting situated in the apex bottom of a 500 ml. conical glass flask equipped with a thermometer and a water-cooled reflux condenser. Vent gas was refrigerated to recover entrained vapors in all but run I of Example 1. No mechanical agitation was provided, but the solid additives were well suspended during the operation by the gas flow. During the peroxidation period when substantially pure oxygen was used the oxygen flow rate was 1 liter per minute per liter of hydrocarbon, and, when air was so used, the air flow rate was 2 liters per minute per liter of hydrocarbon. Overall weight recoveries of hydrocarbon material and resulting products were substantially the same in the exemplary runs, the losses, chiefly vapor losses, being in the vicinity of 5%. In none of the pretreating operations shown did the concentration of hydroperoxide resulting therefrom exceed 0.45 gm. per 100 ml., and in most of the runs it was negligible.

Example 1.—The following four runs were made under comparable conditions except that in run I there was no pretreatment nor addition of preformed secondary butylbenzene hydroperoxide initiator; in run II only oxidative pretreatment was used; in run III only the preformed hydroperoxide initiator was used; and in run IV the synergistic combination of oxidative pretreatment and addition of preformed secondary butylbenzene hydroperoxide was used. In all four runs the secondary butylbenzene charge was prepared in laboratory glassware, the temperature during the hydroperoxidation step was 212° F., and the oxygen-containing gas used was substantially pure oxygen. Additionally, also to maintain the four runs on a comparative basis, one gram of calcium carbonate per 100 ml. of hydrocarbon and one gram of sodium carbonate per 100 ml. of hydrocarbon was present in the hydroperoxidations.

In runs II and IV the pretreatment was done at 257° F. with pure oxygen flowing at the rate of 25.2 liters per hour per liter of hydrocarbon charge for 25 hours. In run III 1.19 grams of preformed secondary butylbenzene hydroperoxide per 100 ml. of hydrocarbon was added to the reaction mixture; in run IV 1.14 grams of preformed secondary butylbenzene hydroperoxide per 100 ml. of hydrocarbon was added to the reaction mixture after the oxidative pretreating and caustic washing had been performed.

The drawing shows experimental results for hydroperoxidation steps of these four runs plotted as the concentration of secondary butylbenzene hydroperoxide against elapsed hydroperoxidation time. Cumulative average rates of formation of secondary butylbenzene hydroperoxide derived from these plots for the various runs up to 30 hours of peroxidation are tabulated below as grams of hydroperoxide per 100 ml. of hydroperoxidation reaction mixture per hour.

| Time, hours | 10 | 15 | 20 | 25 | 30 |
|---|---|---|---|---|---|
| Run IV | 0.23 | 0.26 | 0.285 | 0.308 | 0.327 |
| Run III | 0.08 | 0.093 | 0.100 | 0.112 | 0.137 |
| Run II | 0.04 | 0.060 | 0.090 | 0.116 | 0.140 |
| Run I | <0.01 | <0.01 | <0.01 | <0.01 | 0.003 |

The foregoing data and drawing show that the inventive operation (represented by curve IV) forms secondary butylbenzene hydroperoxide at a substantially higher rate than the combined rates of runs II and III, i.e. with the oxygen pretreatment alone or with the addition of preformed secondary butylbenzene hydroperoxide alone. Actually, this synergistic performance of run IV carried on for a time just under 50 hours.

Example 2.—In this experiment secondary butylbenzene recovered by vacuum distillation of the filtered reaction product of a previous hydroperoxidation was used as the entire charge hydrocarbon. Pretreatment was done at 223–228° F. for 3 hours with substantially pure oxygen flowing at the rate of 84.2 liters per hour per liter of hydrocarbon. After pretreating and caustic washing, 2.82 grams of preformed secondary butylbenzene hydroperoxide per 100 ml. of hydrocarbon was added as well as 0.5 gram per 100 ml. of hydrocarbon of each of the following solid additives: sodium chloride, sodium carbonate and sodium bicarbonate. Air was the oxygen containing gas used during the hydroperoxidation step, which was conducted at 212° F. After 48 hours the secondary butylbenzene hydroperoxide concentration was 28 grams per 100 ml., the cumulative average formation of hydroperoxide being 0.526 gram per 100 ml. per hour for the 48 hours.

Example 3.—This run was conducted like the run described in Example 2 except that freshly prepared secondary butylbenzene was the charge stock rather than recovered secondary butylbenzene and the pretreatment was for 2.5 hours with 73.2 v./v./hr. of oxygen instead of 84.2 v./v./hr. At the end of 48 hours, the hydroperoxide concentration was 26.7 grams per 100 ml., this corresponding to a cumulative average rate of 0.498 gram per 100 ml. per hour for the 48 hours.

Example 4.—This run was like the run shown in Example 3, except that air (52.4 v./v./hr. for 2 hours) was used in the oxidative pretreatment step instead of substantially pure oxygen, and only 1.1 grams per 100 ml. of preformed secondary butylbenzene hydroperoxide was added to the pretreated hydrocarbon to assist in initiating hydroperoxidation. At the end of 48 hours the secondary butylbenzene hydroperoxide concentration was 28.4 grams per 100 ml., this corresponding to an average rate of formation of secondary butylbenzene hydroperoxide of 0.567 gram per 100 ml. per hour.

Example 5.—In the runs here the secondary butylbenzene used was made in pilot plant operation. In the first run pretreatment was done with air flowing at a velocity of 85 liters per hour per liter of secondary butylbenzene for 2 hours using a temperature of 230° F. for the pretreatment. In the second run pretreating was done with substantially pure oxygen flowing at a rate of 97 liters per hour per liter of hydrocarbon for 2 hours at the same temperature. In both runs the hydroperoxidation step was conducted in the presence of 1.1 grams of added preformed secondary butylbenzene hydroperoxide per 100 ml. of hydrocarbon, and also 0.5 gram per 100 ml. each of sodium chloride, sodium carbonate and sodium bicarbonate. Each peroxidation step was done at 212° F. and lasted 48 hours with air blowing.

The concentration of secondary butylbenzene hydroperoxide at the end of the first run was 19 grams per 100 ml. for a cumulative average rate of 0.371 gram per 100 ml. per hour; and at the end of the second run the concentration of secondary butylbenzene hydroperoxide was 19.2 grams per 100 ml. for a cumulative average rate of 0.375 gram per 100 ml. per hour. These two runs show the practical equivalence of substantially pure oxygen and air for my pretreating step. These runs are to be contrasted with the peroxidation on the same kind of secondary butylbenzene, i.e. pilot plant production, using an air pretreatment like the first run of this example (but with no preformed secondary butylbenzene hydroperoxide added in conjunction with such oxidative pretreatment). Additionally, the proportions of the sodium chloride, sodium carbonate and sodium bicarbonate additives, and the hydroperoxidation temperature were the same in this experiment as they were in the preceding two runs. At the end of 48 hours of this experiment the concentration of secondary butylbenzene hydroperoxide was only 4.4 grams per 100 ml., for a cumulative average rate of 0.092 gram per 100 ml. per hour or about a fourth of that in the comparable runs wherein the precepts of my invention were observed.

*Example 6.*—In the following operation pilot plant secondary butylbenzene was used as charge hydrocarbon, and the pretreatment was done with substantially pure oxygen flowing at a rate of 125 liters per hour per liter of hydrocarbon for 2 hours at a hydrocarbon temperature of 230° F. After caustic washing, 1.1 grams of preformed secondary butylbenzene hydroperoxide (from a previous operation) per 100 ml. of hydrocarbon was added, as were 0.5 gram per 100 ml. of sodium chloride, 0.5 gram per 100 ml. of sodium bicarbonate, 0.5 gram per 100 ml. of sodium carbonate, 0.5 gram per 100 ml. of benzoic acid, and 0.05 gram per 100 ml. of lead dioxide. The peroxidation was run with air at 212° F. for 48 hours. At the end of this time the secondary butylbenzene hydroperoxide concentration was 27.3 grams per 100 ml., corresponding to a cumulative average hydroperoxidation rate of 0.544 gram per 100 ml. per hour. Tabulated data for the hydroperoxidation step of this run is shown below.

| Time, hours | 5 | 10 | 20 | 30 | 40 | 48 |
|---|---|---|---|---|---|---|
| Total Hydroperoxide Conc. gm./100 ml | 6.3 | 9 | 13.7 | 18.6 | 23.8 | 27.3 |
| Cumulative Average Rate of Hydroperoxide Formation | 1.02 | 0.78 | 0.625 | 0.58 | 0.565 | 0.544 |

I claim:
1. In the hydroperoxidation of liquid phase secondary butylbenzene with elemental oxygen, the improvement which comprises: as a pretreatment contacting said secondary butylbenzene at a temperature of about 180–260° F. with elemental oxygen for about 10 minutes to 4 hours, terminating said pretreating contact when the secondary butylbenzene hydroperoxide concentration is not substantially in excess of 0.5 gram per 100 ml., contacting the so-treated secondary butylbenzene with a strong base, separating the treated secondary butylbenzene from the strong base, establishing concentration of secondary butylbenzene hydroperoxide in the separated secondary butylbenzene at about 0.8–5 grams per 100 ml. by adding preformed secondary butylbenzene hydroperoxide thereto, and oxidizing the resulting reaction mixture with elemental oxygen at a temperature of 180–260° F. until the secondary butylbenzene hydroperoxide concentration is not substantially in excess of about 30 grams per 100 ml.

2. Process of claim 1 wherein the concentration of preformed secondary butylbenzene hydroperoxide added to the separated pretreated secondary butylbenzene is between about 1 and about 4 grams per 100 ml., and the resulting reaction mixture is oxidized until the secondary butylbenzene hydroperoxide concentration therein is between about 10 and about 20 grams per 100 ml.

3. The process of claim 1 wherein the oxidative pretreatment of and hydroperoxidation of the resulting secondary butylbenzene is done with air, and the hydroperoxidation is terminated when the secondary butylbenzene hydroperoxide concentration in the reaction mixture is between about 10 and about 15 grams per 100 ml.

4. The process of claim 1 wherein the oxidative pretreatment of and hydroperoxidation of the resulting secondary butylbenzene is done with substantially pure oxygen, and the hydroperoxidation is terminated when the secondary butylbenzene hydroperoxide concentration in the reaction mixture is between about 10 and about 15 grams per 100 ml.

References Cited in the file of this patent

UNITED STATES PATENTS

| 2,619,509 | Joris | Nov. 25, 1952 |
| 2,632,772 | Armstrong et al. | Mar. 24, 1953 |
| 2,633,476 | Seubold | Mar. 31, 1953 |
| 2,751,418 | Enos | June 19, 1956 |